United States Patent Office 2,841,626
Patented July 1, 1958

2,841,626

ISOMERIZATION OF PARAFFIN HYDROCARBONS

George Holzman, Walnut Creek, Calif., and George M. Good, Port Chester, N. Y., assignors to Shell Development Company, New York, N. Y., a corporation of Delaware No Drawing. Application March 11, 1957
Serial No. 644,965

4 Claims. (Cl. 260—683.65)

This invention relates to the isomerization of paraffin hydrocarbons having from 4 to 6 carbon atoms and particularly normal pentane, normal hexane and hydrocarbon mixtures consisting essentially thereof.

The object of the invention is to provide an improved process whereby individual paraffin hydrocarbons or hydrocarbon mixtures consisting essentially of paraffin hydrocarbons having up to 6 carbon atoms may be isomerized to hydrocarbons of the same molecular weight but different structure with a minimum conversion to hydrocarbon products other than paraffin hydrocarbons of the same carbon number. A particular object of the invention is to provide an improved process for the production of branched chain hexane hydrocarbons from hydrocarbon fractions consisting essentially of normal hexane or mixtures of normal hexane with some methyl pentanes and/or normal pentane.

Butane, pentane and hexane may be isomerzied to some extent by treating them with hydrogen at elevated temperatures with catalysts containing a noble metal of group VIII in combination with an acidic support, such in particular as platinum supported upon a halogen-containing aluminous carrier. Catalysts of this type are described in U. S. Patents Nos. 2,478,916, 2,479,109, 2,479,-110 and 2,550,531.

The main activity of these catalysts is imparted by a small amount (for instance 0.15 to about 0.6%) of a noble metal of group VIII such, for instance, as platinum and/or palladium or rhodium. The important activities of these metals are enhanced by combining them with a cracking catalyst, or with a carrier containing a promoter which imparts acidity. As described in U. S. Patent 2,478,916, platinum or palladium is combined with one of the clay type cracking catalysts such, for instance, as Super Filtrol (acid treated montmorillonite clay), silica-alumina, silica-zirconia, alumina-boria, etc. In catalysts described in U. S. Patents Nos. 2,479,109 and 2,479,-110 platinum is applied on an alumina carrier promoted by the incorporation of added halogen e. g. fluorine and chlorine.

These catalysts are intended and used for the catalytic reforming of gasolines. They are predominantly dehydrogenation catalysts which increase the octane number of gasolines by dehydrogenating naphthenic hydrocarbons therein and dehydrocyclizing paraffins to aromatics. However, various other reactions including controlled cracking and isomerizations also take place.

If used for the isomerization of lower boiling paraffin hydrocarbons such as butane, normal pentane and normal hexane they suffer the disadvantages that they catalyze the isomerization at practical rates only at quite high temperatures where the thermodynamic equilibrium is not favorable and that as a result of these conditions and the diversified activities of the catalysts such isomerization as is effected is not clean cut but complicated by substantial amounts of side reactions. Recovery of isomerized products which normally boil quite close together is difficult.

It is found that the isomerization of these lower molecular weight paraffin hydrocarbons below heptane may be effected in a much more clean cut manner with the above described catalysts (with the exception noted below) by contacting them in the vapor phase at temperatures between about 480 and 890° F. in the presence of from 2 to about 100% m. water vapor and hydrogen. The amount of hydrogen gas used is generally about 1 mol per mol of paraffin feed or more, e. g. up to 10 mols. The hydrogen gas which need not be pure is preferably recycled. The pressure may vary from atmospheric up to about 100 atm.

The contacting may be carried out by passing the vapors through a fixed bed of the catalyst or by any of the conventional contacting methods. The process may be carried out continuously with no or very infrequent regeneration of the catalyst.

While the efficiency of the isomerization reaction may be increased in the described manner it is essential that the catalyst be substantially free of chlorine. In the practical preparation of supported platinum catalysts a solution of chloroplatinic acid or a solution of platinum derived therefrom is used to incorporate the platinum with the carrier. Chloroplatinic acid is the only water-soluble platinum salt readily available. Thus a chloroplatinic acid solution is used or by adding ammonium hydroxide it may be converted to a water solution of a complex platinum-ammonium-chloride ion. In still other cases the chloroplatinic acid solution may be saturated with hydrogen sulfide to form a solution of colloidal platinum sulfide. In the past it has been considered that when impregnating an aluminous carrier material free of chlorides with such solutions followed by drying, calcining and washing a chloride-free catalyst resulted. It is found, however, that this is not the case. The chloride introduced with the solutions is tenaciously held in the catalyst.

It is found that the chloride ion introduced in this manner should be substantially completely removed from the catalyst since otherwise the desired effect of the steam in the isomerization process is lost. Thus steam, when using the catalyst from which this hitherto unsuspected chloride ion is not removed, tends to cut down to some extent the cracking and other side reactions but it reduces the isomerization by an equal or greater extent so that the desired improvement in the selectivity of isomerization is not attained.

The chlorine introduced inadvertently when incorporating the platinum is probably present in the catalyst in the form of one or more sparingly soluble oxychlorides. These may be decomposed or leached out of the catalyst by a suitable treatment. One suitable method is to leach the catalyst (after the platinum has been reduced to the metallic state) with dilute nitric acid, e. g. 7% nitric acid for around 24 hours, following by leaching with distilled water until the effluent is neutral. Water alone is ineffective for removing the chloride except at quite high temperatures, e. g. 300° C. It is neither possible nor essential to remove every trace of the chlorine as the last traces are very tenaciously held. It is sufficient that the chloride content be reduced to a negligible amount below 0.1%.

*Example.*—Normal hexane was isomerized at a temperature of 475° C., pressure of 500 p. s. i. g., hydrogen to hexane mole ratio around 5 as indicated, with and without steam in an amount of 20 mole percent based on the hydrocarbon feed. The catalyst in the first case consisted of 0.3% platinum incorporated on an alumina carrier promoted with 0.2% fluorine. It was found that the chlorine incorporated with the platinum amounted to 0.47%. The catalyst thus contained about 0.7% halogen. The results are shown in the following table.

|  | No Steam | Steam Added |
|---|---|---|
| Liquid hourly space velocity | 4.0 | 4.1 |
| H₂/hexane, mole ratio | 5.4 | 4.7 |
| Isomerized product, percent w. of charge | 59.9 | 13.2 |
| Ratio, wt. percent isomerized/wt. percent side reaction products | 4.40 | 0.78 |

The detrimental effect of adding steam in this case is clearly evident. Thus, both the isomerization and side reactions were reduced by steam. The isomerization was reduced to a greater extent than the side reactions so that the efficiency of isomerization expressed as the ratio of the isomerized products to side reaction products was reduced from 4 to less than 1.

The above catalyst was treated to remove the chlorine to substantially below 0.1% and additional fluorine was incorporated to re-establish the same halogen content. This was effected by treating the catalyst with a solution of HF containing the required amount of fluorine. Normal hexane was isomerized with this catalyst with and without added steam at the same temperature, pressure and essentially the same ratio of hydrogen to hexane. The results are shown in the following table.

|  | No Steam | Steam Added, 50 Mol Percent Based on Hydrocarbon |
|---|---|---|
| Liquid hourly space velocity | 12 | 11 |
| H₂/hexane, mole ratio | 3.1 | 5.4 |
| Isomerized product, percent w. of charge | 56.2 | 54.6 |
| Ratio, wt. percent isomerized/wt. percent side reaction products | 5.4 | 12.1 |

It will be noted that with no steam present the results were quite comparable to those obtained with the first catalyst containing the chlorine. The presence of steam, however, caused an exactly opposite effect. Thus, whereas with the first catalyst the steam drastically reduced the efficiency of isomerization, it here more than doubled the isomerization efficiency.

This application is a continuation-in-part of application Serial Number 259,164, filed November 30, 1951, now abandoned.

We claim as our invention:

1. Process for the isomerization of paraffin hydrocarbons which comprises contacting a feed consisting of isomerizable paraffin hydrocarbon having less than 7 carbon atoms in the presence of added hydrogen and between about 2 and 100 mole percent of water vapor based on said hydrocarbon with a catalyst containing at most a negligible amount of chlorine below 0.1% and consisting essentially of a noble metal of group VIII in combination with an aluminous carrier having cracking activity at a temperature between about 480 and about 890° F. and pressure between about 1 and 100 atmospheres to effect isomerization of said hydrocarbon as the predominating reaction.

2. A process for the isomerization of normal hexane to branched chain hexanes with decreased side reactions which comprises contacting a hydrocarbon fraction consisting of normal hexane in the presence of about an equal amount of added hydrogen and between 2 and about 100 mole percent of water vapor based on said hexane with a catalyst containing at most a negligible amount of chlorine below 0.1% and consisting essentially of a noble metal of group VIII in combination with an aluminous carrier having cracking activity at a temperature between about 480 and about 890° F. and pressure between about 1 and 100 atmospheres to effect isomerization of said hexane as the predominating reaction.

3. A process for the isomerization of paraffin hydrocarbons which comprises contacting a feed consisting of isomerizable paraffin hydrocarbon having less than 7 carbon atoms in the presence of added hydrogen and between about 2 and 100 mole percent of water vapor based on said hydrocarbon with a catalyst containing at most a negligible amount of chlorine below 0.1% and consisting essentially of a small amount of platinum in combination with an acidic aluminous carrier at a temperature between about 480 and about 890° F. and pressure between about 1 and 100 atmospheres to effect isomerization of said hydrocarbon as the predominating reaction.

4. A process for the isomerization of normal hexane to branched chain hexanes with decreased side reactions which comprises contacting a hydrocarbon fraction consisting of normal hexane in the presence of added hydrogen and between 2 and about 100 mole percent of water vapor based on said hexane with a catalyst containing at most a negligible amount of chlorine below 0.1% and consisting essentially of platinum in combination with an acidic aluminous carrier at a temperature between about 480 and about 890° F. and pressure between 1 and about 100 atmospheres to effect the isomerization of said hexane as the predominating reaction.

References Cited in the file of this patent

UNITED STATES PATENTS 2,642,384　　Cox　　June 16, 1953